United States Patent
Van Baalen et al.

(10) Patent No.: US 12,499,345 B2
(45) Date of Patent: Dec. 16, 2025

(54) SIMULATED LOW BIT-WIDTH QUANTIZATION USING BIT SHIFTED NEURAL NETWORK PARAMETERS

(71) Applicant: QUALCOMM Incorporated, San Diego, CA (US)

(72) Inventors: Marinus Willem Van Baalen, Amsterdam (NL); Brian Kahne, Austin, TX (US); Eric Wayne Mahurin, Austin, TX (US); Tijmen Pieter Frederik Blankevoort, Amsterdam (NL); Andrey Kuzmin, Amsterdam (NL); Andrii Skliar, Diemen (NL); Markus Nagel, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 18/103,428

(22) Filed: Jan. 30, 2023

(65) Prior Publication Data
US 2023/0306233 A1  Sep. 28, 2023

Related U.S. Application Data

(60) Provisional application No. 63/323,450, filed on Mar. 24, 2022.

(51) Int. Cl.
*G06N 3/04* (2023.01)
(52) U.S. Cl.
CPC ...................... *G06N 3/04* (2013.01)

(58) Field of Classification Search
CPC ........................................................ G06N 3/04
See application file for complete search history.

(56) References Cited

U.S. PATENT DOCUMENTS

| | | | |
|---|---|---|---|
| 10,373,050 B2* | 8/2019 | Lin | G06N 3/084 |
| 11,562,208 B2* | 1/2023 | Louizos | G06N 3/0464 |
| 12,165,051 B2* | 12/2024 | Lee | G06N 3/0495 |

(Continued)

OTHER PUBLICATIONS

Han Q., et al., "Extremely Low-bit Convolution Optimization for Quantized Neural Network on Modern Computer Architectures", 9th International Conference on Software Development and Technologies for Enhancing Accessibility and Fighting Info-exclusion, ACMPUB27 | New York, NY | USA, Aug. 17-20, 2020, 12 Pages.

(Continued)

*Primary Examiner* — David E Choi
(74) *Attorney, Agent, or Firm* — Seyfarth Shaw LLP

(57) ABSTRACT

A processor-implemented method includes bit shifting a binary representation of a neural network parameter. The neural network parameter has fewer bits, b, than a number of hardware bits, B, supported by hardware that processes the neural network parameter. The bit shifting effectively multiplies the neural network parameter by $2^{B-b}$. The method also includes dividing a quantization scale by $2^{B-b}$ to obtain an updated quantization scale. The method further includes quantizing the bit shifted binary representation with the updated quantization scale to obtain a value for the neural network parameter.

20 Claims, 6 Drawing Sheets

(56) References Cited

U.S. PATENT DOCUMENTS

| | | | | |
|---|---|---|---|---|
| 2016/0328645 | A1* | 11/2016 | Lin | G06N 3/0495 |
| 2016/0328647 | A1* | 11/2016 | Lin | G06F 17/11 |
| 2019/0332941 | A1* | 10/2019 | Towal | G06N 3/04 |
| 2020/0356850 | A1* | 11/2020 | Fukuda | G06N 3/045 |
| 2021/0089922 | A1* | 3/2021 | Lu | G06N 3/04 |
| 2021/0287095 | A1* | 9/2021 | Lin | G06N 3/0495 |
| 2022/0284260 | A1* | 9/2022 | Patel | G06N 3/10 |
| 2023/0186049 | A1* | 6/2023 | Jing | H04L 9/50 |
| | | | | 706/26 |
| 2023/0206059 | A1* | 6/2023 | Laszlo | G06N 3/082 |
| | | | | 706/25 |
| 2023/0259780 | A1* | 8/2023 | Gao | G06N 3/082 |
| | | | | 706/25 |
| 2023/0306233 | A1* | 9/2023 | Van Baalen | G06N 3/0495 |
| 2023/0368029 | A1* | 11/2023 | Baker | G06N 3/048 |
| 2024/0412076 | A1* | 12/2024 | Gupta | G06N 3/045 |
| 2025/0124265 | A1* | 4/2025 | Lee | G06N 3/0495 |

OTHER PUBLICATIONS

International Search Report and Written Opinion—PCT/US2023/012032—ISA/EPO—May 8, 2023.

Oh J., et al., "Weight Equalizing Shift Scaler-Coupled Post-training Quantization", arxiv.org, Cornell University Library, 201 Olin Library Cornell University Ithaca, NY 14853, Aug. 13, 2020, 9 Pages.

\* cited by examiner

SIMULATED LOW BIT-WIDTH QUANTIZATION USING BIT SHIFTED NEURAL NETWORK PARAMETERS

CROSS-REFERENCE TO RELATED APPLICATION

The present application claims the benefit of U.S. Provisional Patent Application No. 63/323,450, filed on Mar. 24, 2022, and titled "SIMULAIED LOW BIT WIDTH QUANTIZATION USING BIT SHIFTED NEURAL NETWORK PARAMETERS," the disclosure of which is expressly incorporated by reference in its entirety.

FIELD OF THE DISCLOSURE

Aspects of the present disclosure generally relate to reducing power consumption by neural networks, and more specifically to bit shifting neural network parameters to simulate low bit width quantization.

BACKGROUND

Artificial neural networks may comprise interconnected groups of artificial neurons (e.g., neuron models). The artificial neural network may be a computational device or be represented as a method to be performed by a computational device. Convolutional neural networks (CNNs) are a type of feed-forward artificial neural network. Convolutional neural networks may include collections of neurons that each have a receptive field and that collectively tile an input space. Convolutional neural networks, such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Neural networks have achieved impressive breakthroughs in various fields but consume a significant amount of power. In recent years, neural network quantization (e.g., running neural networks on specialized low bit-width integer hardware) has been used to reduce neural network power consumption as lower bit-widths may yield proportionally reduced power consumption. However, designing and producing dedicated low bit-width hardware is challenging and expensive.

SUMMARY

The present disclosure is set forth in the independent claims, respectively. Some aspects of the disclosure are described in the dependent claims.

In aspects of the present disclosure, a processor-implemented method includes bit shifting, by a processor, a binary representation of a neural network parameter. The neural network parameter has fewer bits, b, than a number of hardware bits, B, supported by hardware that processes the neural network parameter. The bit shifting effectively multiplies the neural network parameter by $2^{B-b}$. The processor-implemented method also includes dividing, by the processor, a quantization scale by $2^{B-b}$ to obtain an updated quantization scale. The processor-implemented method further includes quantizing, by the processor, the bit shifted binary representation with the updated quantization scale to obtain a value for the neural network parameter.

Other aspects of the present disclosure are directed to an apparatus. The apparatus has a memory and one or more processors coupled to the memory. The processor(s) is configured to bit shift a binary representation of a neural network parameter. The neural network parameter has fewer bits, b, than a number of hardware bits, B, supported by hardware that processes the neural network parameter. The bit shifting effectively multiplies the neural network parameter by $2^{B-b}$. The processor(s) is also configured to divide a quantization scale by $2^{B-b}$ to obtain an updated quantization scale. The processor(s) is further configured to quantize the bit shifted binary representation with the updated quantization scale to obtain a value for the neural network parameter.

Other aspects of the present disclosure are directed to an apparatus. The apparatus includes means for bit shifting a binary representation of a neural network parameter. The neural network parameter has fewer bits, b, than a number of hardware bits, B, supported by hardware that processes the neural network parameter. The bit shifting effectively multiplies the neural network parameter by $2^{B-b}$. The apparatus also includes means for dividing a quantization scale by $2^{B-b}$ to obtain an updated quantization scale. The apparatus further includes means for quantizing the bit shifted binary representation with the updated quantization scale to obtain a value for the neural network parameter.

In other aspects of the present disclosure, a non-transitory computer-readable medium having program code recorded thereon is disclosed. The program code is executed by a processor and includes program code to bit shift a binary representation of a neural network parameter. The neural network parameter had fewer bits, b, than a number of hardware bits, B, supported by hardware that processes the neural network parameter. The bit shifting effectively multiplies the neural network parameter by $2^{B-b}$. The program code also includes program code to divide a quantization scale by $2^{B-b}$ to obtain an updated quantization scale. The program code further includes program code to quantize the bit shifted binary representation with the updated quantization scale to obtain a value for the neural network parameter.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
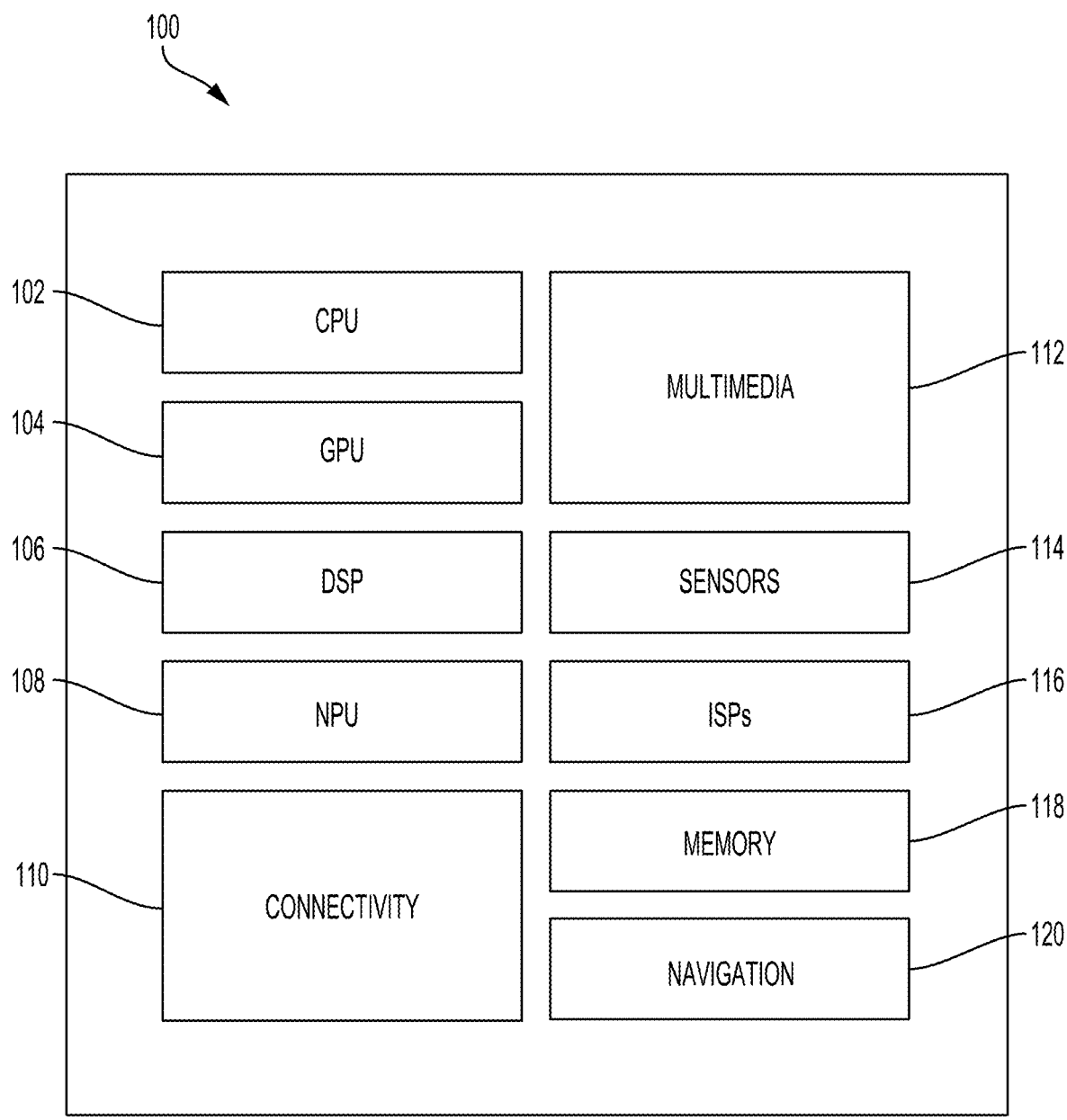
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Some conventional matrix multiplication hardware accelerators split up large matrix multiplications into chunks of weights and activations. These chunks may be calculated in dedicated multiply-accumulate (MAC) arrays to reduce power consumption as a result of data transfer through increased locality. If a bit in an individual MAC array multiplier unit is zero for two or more consecutive cycles (referred to as 'consecutive zero bits'), then this multiplier may consume less power.

Aspects of the present disclosure introduce a low bit width quantization using most significant bits (MSBs). In these aspects, neural network parameter bits are shifted so that the least significant bits (LSBs) are always zero. These aspects may apply to any type of neural network.

In accordance with aspects of the present disclosure, for b bits on B bit hardware, where b<B, all values are bit shifted by B−b bits. In other words, all values may be multiplied by $2^{(B-b)}$. This multiplication may be cancelled by dividing a corresponding quantization scale by $2^{(B-b)}$. This approach may ensure that the B−b least significant bits are always zero for both positive and negative values.

Aspects of the present disclosure may be applicable to per-channel quantization, or for any per-block quantization approach. Moreover, aspects of the present disclosure may enable different simulated bit widths in different channels/blocks. In this case, each block may be shifted by a different number of bits, and each corresponding quantization scale is divided by a different correction factor $2^{(b'-B)}$, where b' denotes the per-channel/per-block bit-width.

Accordingly, aspects of the present disclosure may beneficially be employed on existing hardware without explicit support for (simulated) low bit width quantization.

FIG. 1 illustrates an example implementation of a system-on-a-chip (SOC) 100, which may include a central processing unit (CPU) 102 or a multi-core CPU equipped with low-precision multipliers for the evaluation of a low bit-width, quantized neural network. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In aspects of the present disclosure, the instructions loaded into the general-purpose processor 102 may include code to bit shift a binary representation of a neural network parameter. The general-purpose processor 102 may also include code to divide a quantization scale by $2^{B-b}$ to obtain an updated quantization scale. The general-purpose processor 102 may also include code to quantize the bit shifted binary representation with the updated quantization scale to obtain a value for the neural network parameter.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
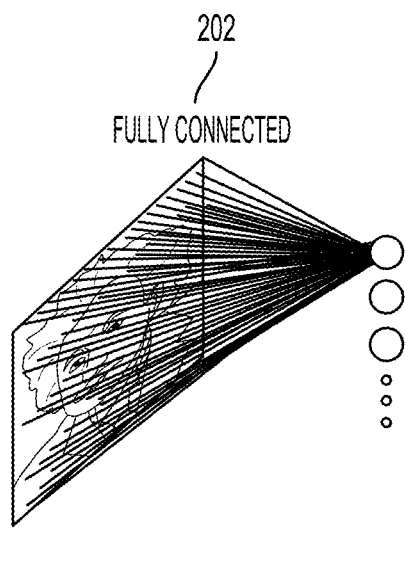
FIGS. 2A, 2B, and 2C are diagrams illustrating a neural network in accordance with aspects of the present disclosure.
Figure 2B:
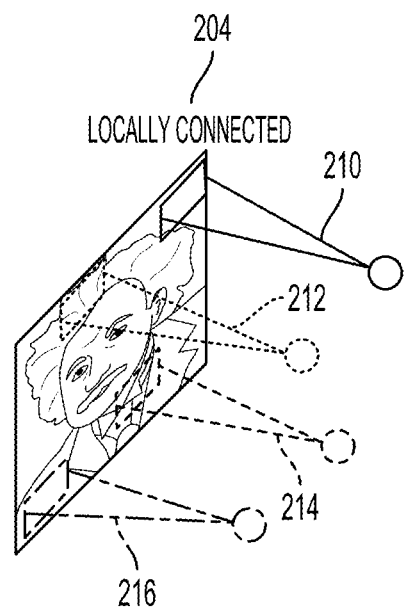

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the properties of a restricted portion of the total input to the network.

Figure 2C:
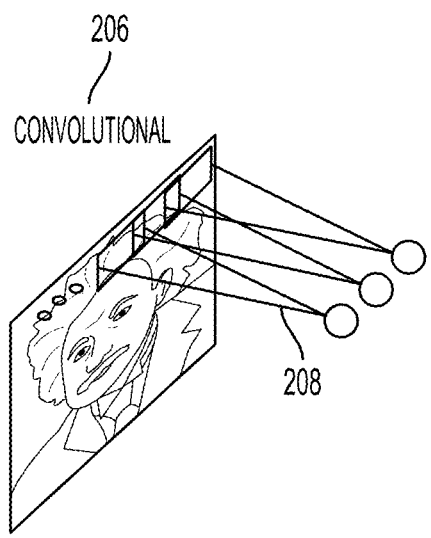

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
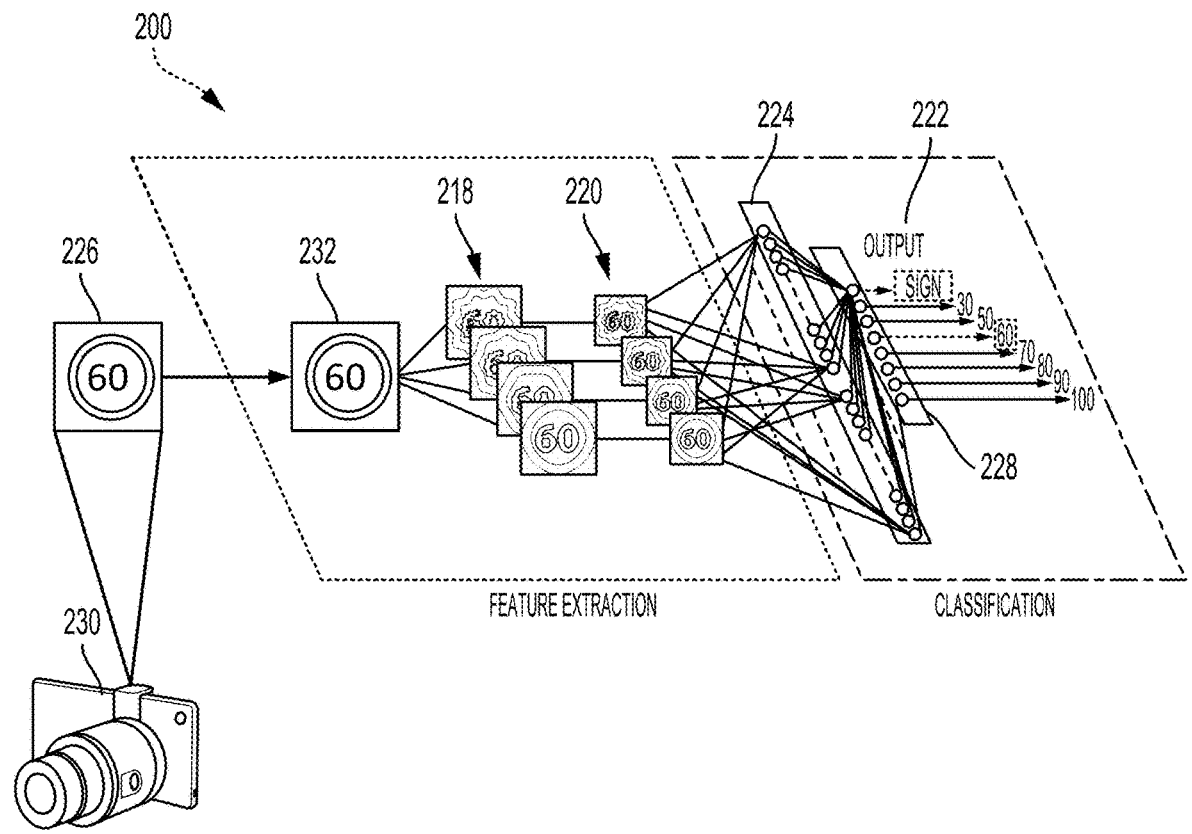
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown)

may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 may likely be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 200 may be presented with new images and a forward pass through the DCN 200 network may yield an output 222 that may be considered an inference or a prediction of the DCN 200.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
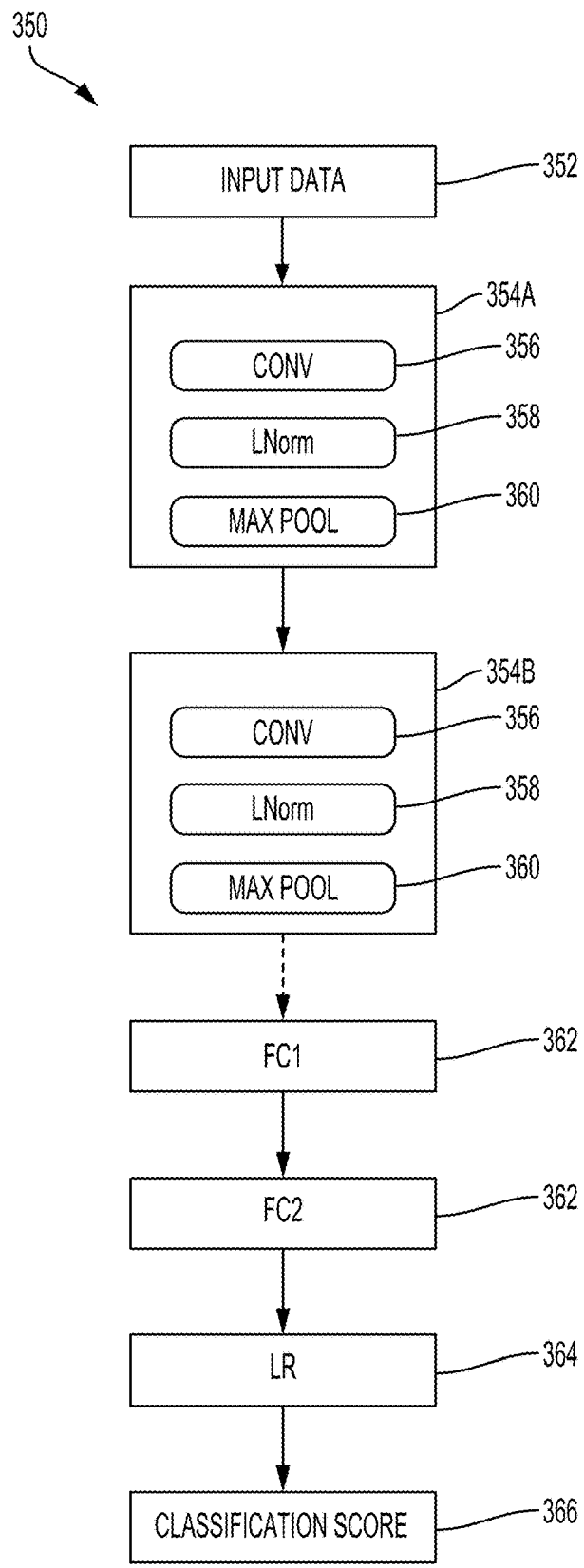
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360. Although only two of the convolution blocks 354A, 354B are shown, the present disclosure is not so limiting, and instead, any number of the convolution blocks 354A, 354B may be included in the deep convolutional network 350 according to design preference.

The convolution layers 356 may include one or more convolutional filters, which may be applied to the input data to generate a feature map. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 (e.g., FIG. 1) to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
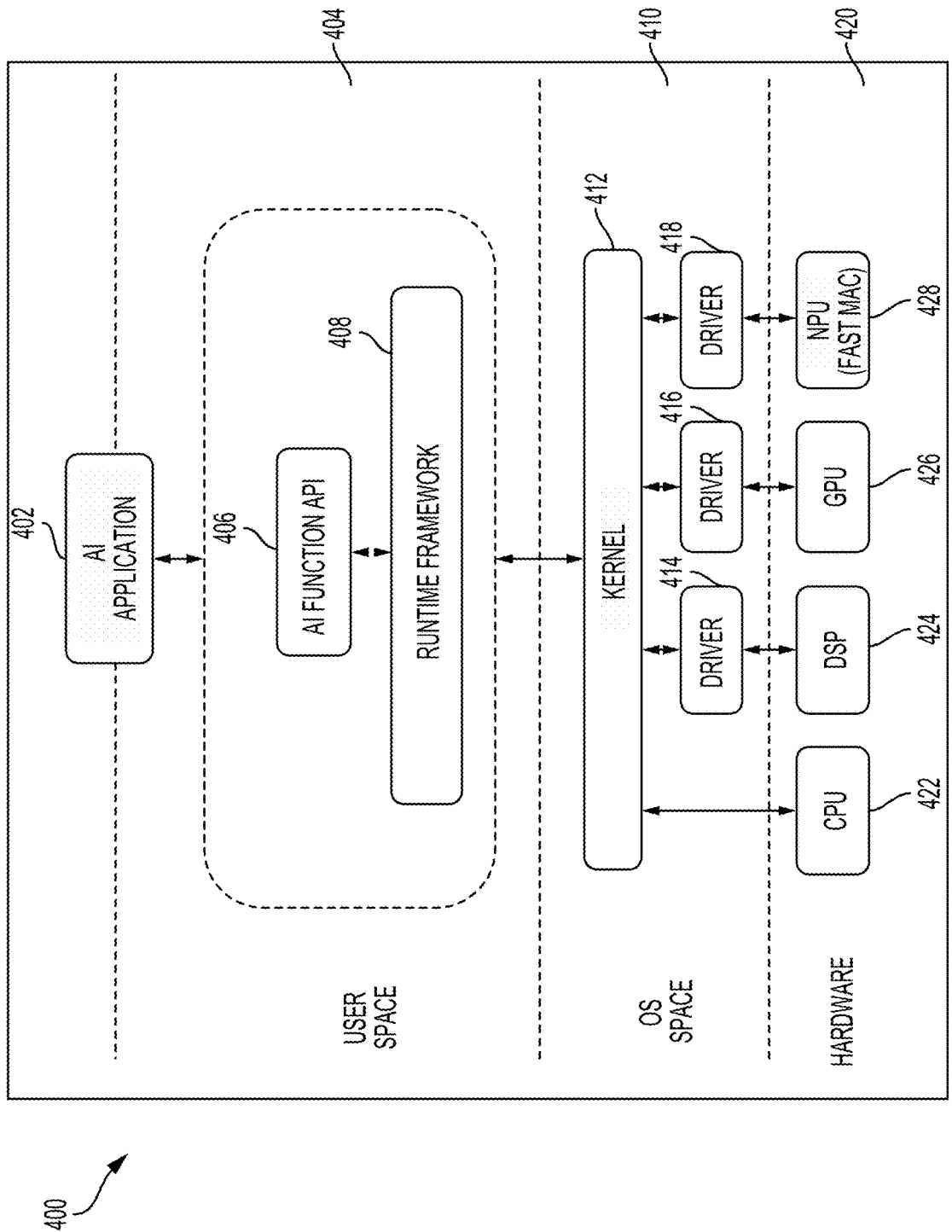
FIG. 4 is a block diagram illustrating an exemplary software architecture that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture 400, applications may be designed that may cause various processing blocks of an SOC 420 (for example a CPU 422, a DSP 424, a GPU 426 and/or an NPU 428) (which may be similar to SoC 100 of FIG. 1) to support simulating low bit width quantization for an AI application 402, according to aspects of the present disclosure. The architecture 400 may, for example, be included in a computational device, such as a smartphone.

The AI application 402 may be configured to call functions defined in a user space 404 that may, for example, provide for the detection and recognition of a scene indicative of the location at which the computational device including the architecture 400 currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine 408, for example, to request an inference at a particular time interval or triggered by an event detected by the user interface of the AI application 402. When caused to provide an inference response, the run-time engine 408 may in turn send a signal to an operating system in an operating system (OS) space 410, such as a kernel 412, running on the SOC 420. In some examples, the Kernel 412 may be a Linux kernel. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The AI application 402 may be configured to call functions defined in the user space 404 that may, for example, provide for the detection and recognition of a scene indicative of the location in which the computational device including the architecture 400 currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the AI application 402. The AI application 402 may cause the run-time engine 408, for example, to request a scene estimate at a particular time interval or triggered by an event detected by the user interface of the application. When caused to estimate the scene, the run-time engine 408 may in turn send a signal to the operating system 410, such as the Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as the driver 414-418 for the DSP 424, for the GPU 426, or for the NPU 428. In the exemplary example, the differential neural network may be configured to run on a combination of processing blocks, such as the CPU 422 and the GPU 426, or may be run on the NPU 428.

Generally speaking, neural networks can consume a significant amount of power. High power consumption in compute cores may lead to lower battery life. As a result, compute cores may be power throttled, in other words, reducing clock speed to lower power consumption.

Neural signal processor (NSP) multipliers consume less power if the received input is zero for two consecutive cycles. This effect works at the bit level. That is, if the same bit is zero in the same multiplier for two consecutive cycles, power consumption is reduced. Using lower bit widths on higher bit width hardware increases a number of bits with zero values. For example, when using four bit values on eight bit hardware, for positive values, the four most significant bits are always zero. A four bit integer (INT4) has an unsigned range: [0, 15] in decimal, which is [00000000, 00001111] in eight bit integer (INT8) binary.

However, this solution does not work for signed negative values because negative integers are encoded using two's complement encoding. Continuing with the example of four bit values on eight bit hardware, in decimal, the signed INT4 range is: [−8, 7], which is [11111000, 00000111] in INT8 binary. It would be desirable for certain bits to always be zero. This is not possible, however, with existing solutions if the range of possible values contains negative numbers.

To use efficient low bit integer hardware, a network may be quantized to an appropriate bit-width. As an example, an eight bit quantization of a floating point tensor X may be given by:

$$X \approx Z_q \quad (1)$$

$$= s_x \cdot X_{int} \quad (2)$$

$$X_{int} = \text{clip}\left(\left\lfloor\frac{X}{s_x}\right\rceil, \text{int\_min}, \text{int\_max}\right), \quad (3)$$

where (int_min, int_max) is (0, 255) for unsigned and (−128, 127) for signed tensors, and $s_x$ is a quantization scale for the tensor X, set heuristically or through gradient descent on some target loss function. A matrix-matrix product WX may be approximated as follows $$WX \approx W_q X_q \quad (4)$$

$$= s_w s_x W_{int} X_{int}. \quad (5)$$

where W denotes weights and $s_w$ is a quantization scale for the weights W. Because only integer multiplications are used to compute the product $W_{int}X_{int}$, this computation can be run on efficient low-precision hardware. Although matrix-matrix multiplications are used, this is merely an example for illustrative purposes. Instead, convolutions and certain extensions such as per-channel quantization may also be used.

To improve quantized performance, quantization-aware training (QAT) may be employed. In some conventional approaches, the (non-differentiable) quantization operation is used in the forward pass but ignored in the backward pass. However, these conventional quantization procedures introduce noise to weight and activation tensors. Because some neural network layers are more sensitive to noise than other layers, some conventional approaches utilize mixed precision quantization (MPQ). Mixed precision quantization uses tensor specific bit-widths instead of a fixed bit-width for each tensor in the network. The resulting space of MPQ configurations, however, grows exponentially with the number of layers in a network, precluding exhaustive search.

Computations for a neural network layer can be seen as a matrix-matrix multiplication Y=WX between input activations X and weights W. The product WX entails the multiplication of individual elements in W with elements in X and the addition (accumulation) of the resulting scalar products. Neural network accelerators may be implemented in hardware as multiply-accumulate (MAC) arrays, in which a subset of weights is multiplied with a subset of activations in parallel each cycle, and subsequently accumulated. For example, a MAC array having 16 weights $W_{1:4,1:4}$ and four activations $X_{1:4,k}$ as input, would have 16 multipliers and four accumulators. In each cycle, the scalar products $W_{nm}X_{mk}$ may be computed in parallel, in multipliers $M_{nm}$; n, m∈ [1,4]. The (partial) results for $Y_{1:4,k}$ may be stored in the accumulators.

If one of the inputs to a multiplier $M_{mn}$ is zero for two or more consecutive cycles, then the multiplier $M_{mn}$ may not consume power. This power savings occurs at the bit level. That is, if the same input bit in a multiplier is zero for two consecutive cycles, the activity in gates toggling the bits between zero or one may be reduced, and in some aspects, avoided. Thus, the power consumption for each such input bit that remains zero for consecutive cycles may be greatly reduced and, in some aspects, avoided.

Accordingly, to reduce power consumption, aspects of the present disclosure aim to increase consecutive zero bits. In accordance with aspects of the present disclosure, low bit-width (e.g., four bit) quantization may be simulated in higher bit-width (e.g., eight bit or 16 bit) hardware. Because activation tensors in rectifier linear unit (ReLU) networks may be sparser than the corresponding weights, significant gains may be achieved by increasing the number of consecutive zero bits in the weights. However, this is merely an example and not limiting. Aspects of the present disclosure may be applied in other tensors and other types of neural networks.

Low bit-width weights may be simulated on higher bit-width hardware by limiting the range of (integer) values weights can take. For example, simulating four bit integer quantization on eight bit hardware may be achieved by limiting the range of integer weight values to [−8, 7]. However, due to the sign extension as a result of two's complement encoding of negative numbers, negative values may be represented with 1s in the most significant bits (MSBs). Because one aim is to increase, and in some aspects, to maximize the number of consecutive zero bits, this property may be undesirable.

To avoid the sign extension in two's complement encoding, low bit integer weights may instead be bit-shifted by an appropriate amount. Bit-shifting an integer by b bits may be considered equivalent to multiplying by $2^b$. As such, when simulating signed b bit quantization on B bit hardware, each value may be multiplied by $2^{B-b}$ to effectively bit-shift each value by B−b bits. To offset the effect of bit-shifting, a quantization scale s may be adjusted according to $$\hat{s} = \frac{s}{2^{B-b}}.$$

In one example, signed four bit weights may be simulated on eight bit hardware. A signed weight tensor $W_{int}$ with values in the range [−8, 7] and an associated scale $s_w$ may be specified. A binary representation of the range [−8, 7] may be given by [11111000, 00000111]. In this example, consecutive zero bits may only occur if consecutive values are either both positive or both negative numbers. To circumvent this scenario, $\widehat{W_q}$ may be defined as $\widehat{W_q} = 2^4 \cdot W_{int}$, which may effectively shift each value in $W_{int}$ by four bits. Doing so may yield a range from [−128, 112] in decimal representation or a binary representation of [10000000, 01110000]. Because the resulting values are multiples of 16, the least significant four bits will now be zero, independent of the represented values. In some aspects, the effect of multiplication by 16 may be canceled by using a quantization scale $$\widehat{s_w} = \frac{s_w}{16}.$$

As such, the resulting integer matrix product remains mathematically equivalent as given by:

$$\widehat{s_w} s_x \widehat{W_{int}} X_{int} = \frac{s_w}{16} s_x 16 W_{int} X_{int} = s_w s_x W_{int} X_{int}. \quad (6)$$

Figure 5:
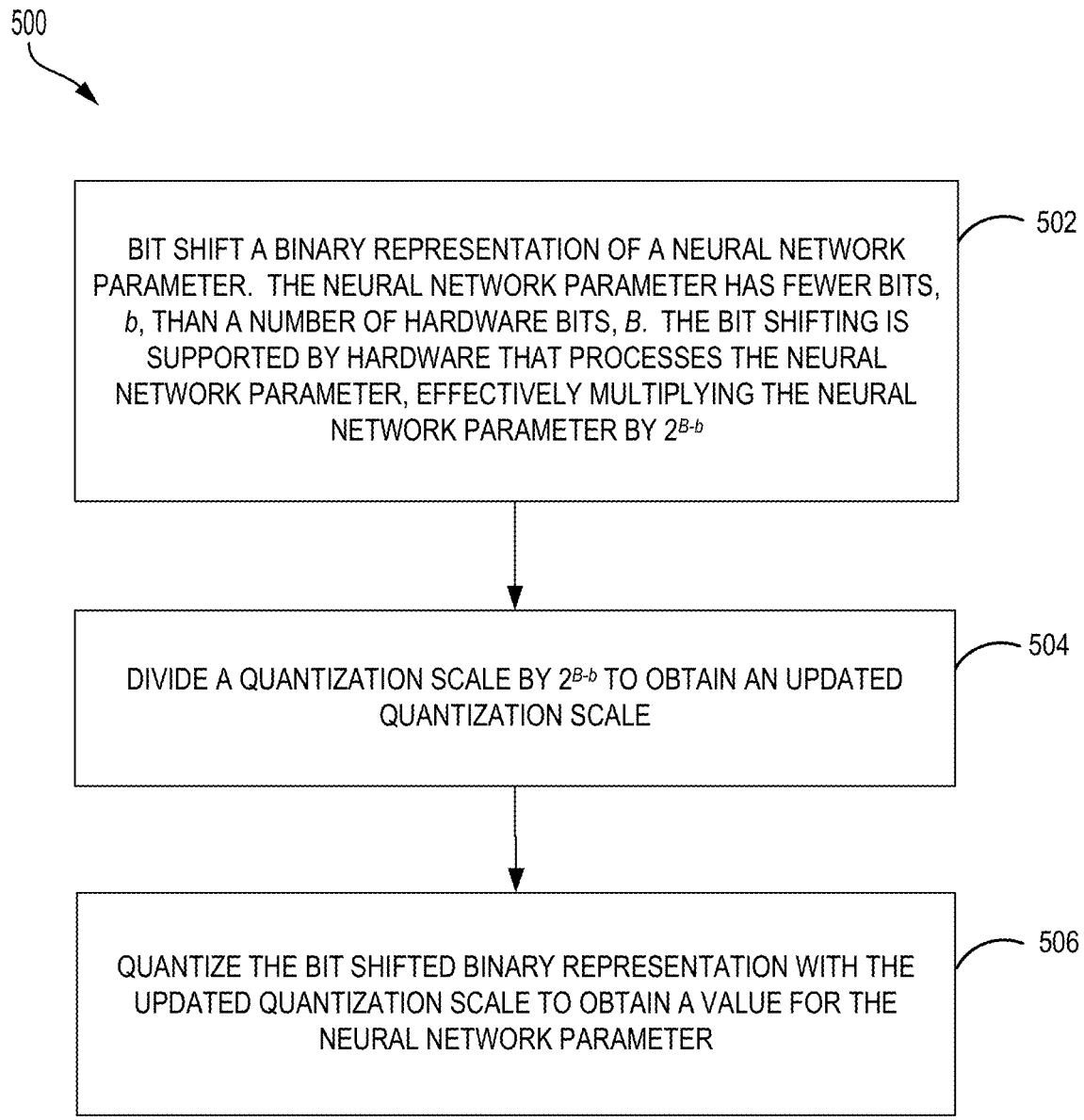
FIG. 5 is a process flow diagram illustrating a processor-implemented method for reducing power consumption of neural networks by bit-shifting, in accordance with aspects of the present disclosure.

FIG. 5 is a process flow diagram illustrating a processor-implemented method 500 for reducing power consumption of neural networks by bit-shifting, in accordance with aspects of the present disclosure. In some aspects, processor-implemented method 500 may be performed by a processor such as the CPU 102 or the NPU 108, for example. As shown in FIG. 5, at block 502, the processor may bit shift a binary representation of a neural network parameter. The neural network parameter has fewer bits, b, than a number of hardware bits, B, supported by hardware that processes the neural network parameter. The bit shifting effectively multiplies the neural network parameter by $2^{B-b}$.

At block 504, the processor divides a quantization scale by $2^{B-b}$ to obtain an updated quantization scale. As described, to offset the effect of bit-shifting, a quantization scale s may be adjusted according to $$\hat{s} = \frac{s}{2^{B-b}}.$$

At block 506, the processor quantizes the bit shifted binary representation with the updated quantization scale to obtain a value for the neural network parameter.

Example Aspects

Aspect 1: A processor-implemented method, comprising: bit shifting, by a processor, a binary representation of a neural network parameter, the neural network parameter having fewer bits, b, than a number of hardware bits, B, supported by hardware that processes the neural network parameter, the bit shifting effectively multiplying the neural network parameter by $2^{B-b}$; dividing, by the processor, a quantization scale by $2^{B-b}$ to obtain an updated quantization scale; and quantizing, by the processor, the bit shifted binary representation with the updated quantization scale to obtain a value for the neural network parameter.

Aspect 2: The processor-implemented method of Aspect 1, in which the neural network parameter has seven or fewer bits and the hardware supports eight bit values.

Aspect 3: The processor-implemented method of Aspect 1 or 2, in which the neural network parameter has four bits and the hardware supports eight bit values.

Aspect 4: The processor-implemented method of any of the preceding Aspects, in which the binary representation of the neural network parameter is bit shifted such that a difference B-b of least significant bits has a value of zero.

Aspect 5: The processor-implemented method of any of the preceding Aspects, in which the neural network parameter comprises a neural network weight tensor or a neural network activation tensor.

Aspect 6: An apparatus, comprising: a memory; and at least one processor coupled to the memory, the at least one processor configured: to bit shift a binary representation of a neural network parameter, the neural network parameter having fewer bits, b, than a number of hardware bits, B, supported by hardware that processes the neural network parameter, the bit shifting effectively multiplying the neural network parameter by $2^{B-b}$; to divide a quantization scale by $2^{B-b}$ to obtain an updated quantization scale; and to quantize the bit shifted binary representation with the updated quantization scale to obtain a value for the neural network parameter.

Aspect 7: The apparatus of Aspect 6, in which the neural network parameter has seven or fewer bits and the hardware supports eight bit values.

Aspect 8: The apparatus of Aspect 6 or 7, in which the neural network parameter has four bits and the hardware supports eight bit values.

Aspect 9: The apparatus of any of the Aspects 6-8, in which the at least one processor is further configured to bit shift the binary representation of the neural network parameter such that a difference B-b of least significant bits has a value of zero.

Aspect 10: The apparatus of any of the Aspects 6-9, in which the neural network parameter comprises a neural network weight tensor or a neural network activation tensor.

Aspect 11: An apparatus, comprising: means for bit shifting a binary representation of a neural network parameter, the neural network parameter having fewer bits, b, than a number of hardware bits, B, supported by hardware that processes the neural network parameter, the bit shifting effectively multiplying the neural network parameter by $2^{B-b}$; means for dividing a quantization scale by $2^{B-b}$ to obtain an updated quantization scale; and means for quantizing the bit shifted binary representation with the updated quantization scale to obtain a value for the neural network parameter.

Aspect 12: The apparatus of Aspect 11, in which the neural network parameter has seven or fewer bits and the hardware supports eight bit values.

Aspect 13: The apparatus of Aspect 11 or 12, in which the neural network parameter has four bits and the hardware supports eight bit values.

Aspect 14: The apparatus of any of the Aspects 11-13, further comprising means to bit shift the binary representation of the neural network parameter such that a difference B-b of least significant bits has a value of zero.

Aspect 15: The apparatus of any of the Aspects 11-14, in which the neural network parameter comprises a neural network weight tensor or a neural network activation tensor.

Aspect 16: A non-transitory computer-readable medium having program code recorded thereon, the program code executed by a processor and comprising: program code to bit shift a binary representation of a neural network parameter, the neural network parameter having fewer bits, b, than a number of hardware bits, B, supported by hardware that processes the neural network parameter, the bit shifting effectively multiplying the neural network parameter by $2^{B-b}$; program code to divide a quantization scale by $2^{B-b}$ to obtain an updated quantization scale; and program code to quantize the bit shifted binary representation with the updated quantization scale to obtain a value for the neural network parameter.

Aspect 17: The non-transitory computer-readable medium of Aspect 16, in which the neural network parameter has seven or fewer bits and the hardware supports eight bit values.

Aspect 18: The non-transitory computer-readable medium of Aspect 16 or 17, in which the neural network parameter has four bits and the hardware supports eight bit values.

Aspect 19: The non-transitory computer-readable medium of any of the Aspects 16-18, further comprising program code to bit shift the binary representation of the neural network parameter such that a difference B-b of least significant bits has a value of zero.

Aspect 20: The non-transitory computer-readable medium of any of the Aspects 16-19, in which the neural network parameter comprises a neural network weight tensor or a neural network activation tensor.

In one aspect, the bit shifting means, dividing means, and/or quantizing means may be the CPU 102, program memory associated with the CPU 102, the dedicated memory block 118, fully connected layers 362, NPU 428 and/or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A processor-implemented method, comprising:
   bit shifting, by a processor, a binary representation of a neural network parameter, the neural network parameter having fewer bits, b, than a number of hardware bits, B, supported by hardware that processes the neural network parameter, the bit shifting effectively multiplying the neural network parameter by $2^{B-b}$;
   dividing, by the processor, a quantization scale by $2^{B-b}$ to obtain an updated quantization scale; and
   quantizing, by the processor, the bit shifted binary representation with the updated quantization scale to obtain a value for the neural network parameter.

2. The processor-implemented method of claim 1, in which the neural network parameter has seven or fewer bits and the hardware supports eight bit values.

3. The processor-implemented method of claim 1, in which the neural network parameter has four bits and the hardware supports eight bit values.

4. The processor-implemented method of claim 1, in which the binary representation of the neural network parameter is bit shifted such that a difference B-b of least significant bits has a value of zero.

5. The processor-implemented method of claim 1, in which the neural network parameter comprises a neural network weight tensor or a neural network activation tensor.

6. An apparatus, comprising:
   a memory; and
   at least one processor coupled to the memory, the at least one processor configured:
      to bit shift a binary representation of a neural network parameter, the neural network parameter having fewer bits, b, than a number of hardware bits, B, supported by hardware that processes the neural network parameter, the bit shifting effectively multiplying the neural network parameter by $2^{B-b}$;
      to divide a quantization scale by $2^{B-b}$ to obtain an updated quantization scale; and
      to quantize the bit shifted binary representation with the updated quantization scale to obtain a value for the neural network parameter.

7. The apparatus of claim 6, in which the neural network parameter has seven or fewer bits and the hardware supports eight bit values.

8. The apparatus of claim 6, in which the neural network parameter has four bits and the hardware supports eight bit values.

9. The apparatus of claim 6, in which the at least one processor is further configured to bit shift the binary representation of the neural network parameter such that a difference B-b of least significant bits has a value of zero.

10. The apparatus of claim 6, in which the neural network parameter comprises a neural network weight tensor or a neural network activation tensor.

11. An apparatus, comprising:
    means for bit shifting a binary representation of a neural network parameter, the neural network parameter having fewer bits, b, than a number of hardware bits, B, supported by hardware that processes the neural network parameter, the bit shifting effectively multiplying the neural network parameter by $2^{B-b}$;
    means for dividing a quantization scale by $2^{B-b}$ to obtain an updated quantization scale; and
    means for quantizing the bit shifted binary representation with the updated quantization scale to obtain a value for the neural network parameter.

12. The apparatus of claim 11, in which the neural network parameter has seven or fewer bits and the hardware supports eight bit values.

13. The apparatus of claim 11, in which the neural network parameter has four bits and the hardware supports eight bit values.

14. The apparatus of claim 11, further comprising means to bit shift the binary representation of the neural network parameter such that a difference B-b of least significant bits has a value of zero.

15. The apparatus of claim 11, in which the neural network parameter comprises a neural network weight tensor or a neural network activation tensor.

16. A non-transitory computer-readable medium having program code recorded thereon, the program code executed by a processor and comprising:
    program code to bit shift a binary representation of a neural network parameter, the neural network parameter having fewer bits, b, than a number of hardware bits, B, supported by hardware that processes the neural network parameter, the bit shifting effectively multiplying the neural network parameter by $2^{B-b}$;
    program code to divide a quantization scale by $2^{B-b}$ to obtain an updated quantization scale; and
    program code to quantize the bit shifted binary representation with the updated quantization scale to obtain a value for the neural network parameter.

17. The non-transitory computer-readable medium of claim 16, in which the neural network parameter has seven or fewer bits and the hardware supports eight bit values.

18. The non-transitory computer-readable medium of claim 16, in which the neural network parameter has four bits and the hardware supports eight bit values.

19. The non-transitory computer-readable medium of claim 16, further comprising program code to bit shift the binary representation of the neural network parameter such that a difference B-b of least significant bits has a value of zero.

20. The non-transitory computer-readable medium of claim 16, in which the neural network parameter comprises a neural network weight tensor or a neural network activation tensor.

* * * * *